United States Patent
Sorkin

(10) Patent No.: US 7,273,238 B1
(45) Date of Patent: Sep. 25, 2007

(54) DUCT COUPLER APPARATUS WITH COMPRESSIBLE SEALS

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 236 days.

(21) Appl. No.: 10/983,537

(22) Filed: Nov. 8, 2004

Related U.S. Application Data

(63) Continuation-in-part of application No. 10/972,265, filed on Oct. 25, 2004.

(51) Int. Cl.
*F16L 19/00* (2006.01)

(52) U.S. Cl. .............. 285/354; 285/903; 285/369; 285/372; 403/286; 403/288; 277/616

(58) Field of Classification Search ........... 285/354, 285/369, 372, 903, 95, 233, 423, 908; 52/223.1, 52/223.4, 223.8, 223.14, 223.13, 726.1; 277/609, 277/613, 616, 622; 403/286, 288, 293, 305
See application file for complete search history.

(56) References Cited

U.S. PATENT DOCUMENTS

| | | | |
|---|---|---|---|
| 2,021,745 A | * | 11/1935 | Pfefferle et al. ............ 277/607 |
| 2,192,565 A | * | 3/1940 | Szekely ...................... 277/622 |
| 2,460,032 A | * | 1/1949 | Risley ........................ 285/233 |
| 2,755,111 A | * | 7/1956 | Newell et al. .............. 277/622 |
| 5,320,391 A | | 6/1994 | Luthi |
| 5,474,335 A | | 12/1995 | Sorkin |
| 5,775,849 A | | 7/1998 | Sorkin |
| 5,954,373 A | * | 9/1999 | Sorkin ........................ 285/312 |
| 6,752,435 B1 | | 6/2004 | Sorkin |
| 6,764,105 B1 | | 7/2004 | Sorkin |

* cited by examiner

*Primary Examiner*—Aaron Dunwoody
*Assistant Examiner*—Fannie C. Kee
(74) *Attorney, Agent, or Firm*—Egbert Law Offices

(57) ABSTRACT

An apparatus for joining the ends of a pair of ribbed ducts together has a collar with an interior suitable for receiving the ends of the pair of ducts therein, a first coupler element translatably secured adjacent a first end of the collar, a compressible seal disposed between a surface of the first coupler element and the first end of the collar, a second coupler element secured adjacent a second end of the collar, and a second seal disposed between a surface of the second coupler element and the second end of the collar. The coupler elements are translatable so as to compress the seal such that a surface of the seal will bear against a respective rib of the pair of ducts.

8 Claims, 2 Drawing Sheets

DUCT COUPLER APPARATUS WITH COMPRESSIBLE SEALS

RELATED U.S. APPLICATIONS

The present application is a continuation-in-part of U.S. patent application Ser. No. 10/972,265, filed on 25 Oct. 2004, and entitled "Duct Coupler Apparatus", presently pending.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a duct coupler, and more particularly to a coupler for providing a water-tight joint between adjacent sections of duct used to provide a channel for multi-strand post-tensioning of concrete structures.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

Several patents have issued relating to duct couplers. For example, U.S. Pat. No. 5,320,319, issued on Jun. 14, 1994, to K. Luthi describes a coupling element which is fitted with chamfered flanges. The sheaths of the coupler have protrusions which are inserted into the coupling element with a tubular element which forms the end of the sheaths. A sealing ring is inserted between each of the flanges and protrusions of the sheaths. The flanges and the protrusions are held together by sloping surfaces and by a groove worked within each socket. Also, U.S. Pat. No. 5,474,335, issued on Dec. 12, 1995, to the present inventor, describes a duct coupler for joining and sealing between adjacent sections of the duct. The coupler includes a body, flexible cantilevered sections on the end of the body adapted to pass over annular protrusions on the duct and locking rings for locking the cantilevered flexible sections into position, so as to lock the coupler onto the duct.

U.S. Pat. No. 5,775,849, issued on Jul. 7, 1998 to the present inventor, describes a coupler as used for ducts in post-tension anchorage systems. This duct system includes a first duct having a plurality of corrugations extending radially outwardly therefrom, a second duct having a plurality of corrugations extending radially outwardly therefrom, and a tubular body threadedly receiving the first duct at one end and threadedly receiving the second duct at the opposite end. The tubular body has a first threaded section formed on an inner wall of the tubular body adjacent one end of the tubular body and a second threaded section formed on the inner wall of the tubular body adjacent an opposite end of the tubular body. The threaded sections are formed of a harder polymeric material than the polymeric material of the first and second ducts. The tubular body has an outer diameter which is less than the diameter of the ducts at the corrugations. The first and second threaded sections have a maximum inner diameter which is less than the outer diameter of the ducts at the end of the ducts. First and second elastomeric seals are affixed to opposite end of the tubular body and juxtaposed against a surface of a corrugation of the first and second ducts.

U.S. Pat. No. 5,954,373, issued on Sep. 21, 1999 to the present inventor, describes a different type of duct coupler apparatus. The duct coupler apparatus of this patent includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body. The compression device includes an arm with an end hingedly connected to the tubular body and having an abutment surface adjacent the end. The arm is movable between a first position extending outwardly of an exterior of the tubular body and a second position aligned with an exterior surface of the tubular body. A latching member is connected to an opposite end of the arm and serves to affix the arm in the second position. The abutment surface of the arm serves to push a corrugation of the duct against the seal and against the shoulder so as to form a liquid-tight seal between the duct and the interior of the coupler.

It is an object of the present invention to provide a coupler for sealing between adjacent sections of an elongated duct.

It is another object of the present invention to provide a coupler which facilitates installation by the user and which, when engaged with the opposed ends, will securely seal against the intrusion of corrosive elements and to prevent the leakage of sealing materials from the interior of the duct.

It is a further object of the present invention to provide a coupler which includes compressible seals for securely engaging coupler sections together and for conforming the seals to the surfaces of the duct.

It is another object of the present invention to provide a coupler which is easy to use, easy to manufacture and relatively inexpensive.

It is still a further object of the present invention to provide a duct coupler apparatus which maintains the integrity of an annular seal in the area of the connections between the coupler and the duct.

It is still another object of the present invention to provide a duct coupler apparatus which prevents the ducts from longitudinally separating from each other.

These and other objects and advantages of the present invention will become apparent from a reading of the attached specification and appended claims.

BRIEF SUMMARY OF THE INVENTION

The present invention is an apparatus for joining the ends of a pair of ducts together. The apparatus of the present invention has a collar with an interior suitable for receiving the pair of ducts therein in end-to-end relationship. The collar has a first end and a second end. A first coupler element is translatably secured to an exterior of the collar adjacent a first end. This first coupler element has a lip at an outer end thereof. A compressible first seal is disposed between the first end of the collar and the lip of the first coupler element. The first coupler element is translatable so as to compress the first seal such that the first seal extends toward the interior of the collar. A second coupler element is secured to the exterior of the collar adjacent the second end. The second coupler element also has a lip at an outer end thereof. A second seal is disposed between the lip of the second coupler element and the second end of the collar.

In the present invention, the first seal is affixed to the first end of the collar and the second seal is affixed to the second end of the collar. The second seal is also compressible. The second coupler element is translatable so as to compress the seal such that the second seal extends toward the interior of the collar. The first coupler element is threadedly translatable on the collar. The first coupler element is rotatable so as to move the lip thereof so as to compress the first seal. The second coupler element is also threadedly translatable on the collar. The second coupler element is rotatable so as to move the lip thereof so as to compress the second seal.

In the present invention, the first end of the collar has a notch formed on an outer surface thereof. The first seal has an extended portion received in this notch. Similarly, the second end of the collar has a notch formed at an outer surface thereof. The second seal has an extended portion received in this notch at the second end of the collar. The first seal has a surface that is flush with the inner wall of the collar when uncompressed. Similarly, the second seal has a surface that is flush with the inner wall of the collar when uncompressed. The lip of the first coupler element extends radially inwardly therefrom. Similarly, the lip of the second coupler element extends radially inwardly therefrom. The first seal is interposed between an inner surface of the lip of the first coupler element and the first end of the collar. The second seal is interposed between the inner surface of the lip of the second coupler element and the second end of the collar.

In the present invention, each of the collar and the first and second coupler elements are formed of a polymeric material. The first and second seals are formed of an elastomeric material.

Each of the first and second coupler elements has a plurality of ribs formed on an exterior surface thereof. Each of the plurality of ribs extends longitudinally for at least a portion of a length of the coupler element. This plurality of ribs are radially spaced from each other around the diameter of the coupler element. The collar has a constant inner diameter extending entirely between the first end and the second end of the collar.

In use, a first duct and a second duct have respective ends received within the interior of the collar. The first and second coupler elements are suitably translatable such that the surface on the lip of each of the coupler elements bears against a surface of the respective first and second seals. With further movement of the first and second coupler elements, the first and second seals suitably compress so as to extend toward the interior of the collar and bear against the respective ribs on the first and second ducts so as to lock the ducts in a proper end-to-end longitudinally aligned position. In particular, the first and second coupler elements can be rotated with respect to the collar so as to apply pressure on the edges of the seal so as to suitably compress the seal and to cause the seals to extend downwardly in a bearing relationship against opposed surfaces of respective ribs on the first and second ducts. A plurality of tendons extend longitudinally through the interior of the ducts and through the interior of the collar. A grout material fills the interior of the first and second ducts. The collar and the first and second coupler elements form a liquid-tight seal with the first and second ducts respectively so as to prevent grout from flowing outwardly of the first and second ducts and to prevent grout from flowing outwardly of the first and second ducts, to prevent liquids from intruding into the interior of the first and second ducts, and to prevent the first and second ducts from moving longitudinally from each other.

DETAILED DESCRIPTION OF THE INVENTION

Figure 1:
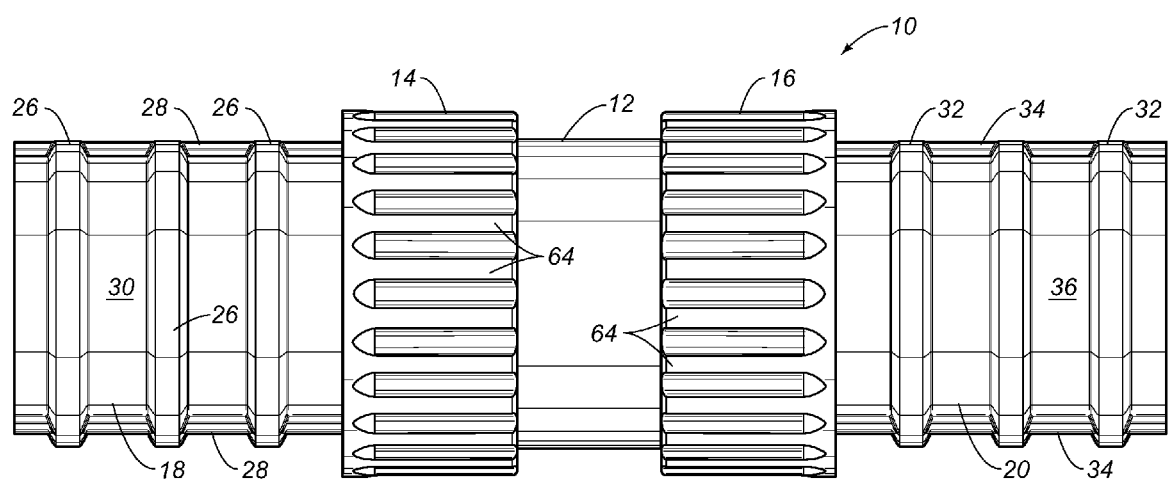
FIG. 1 is a side elevational view showing the coupler apparatus of the present invention as applied to first and second ducts.

Referring to FIG. 1, there is shown the coupler apparatus 10 in accordance of the preferred embodiment of the present invention. The coupler apparatus 10 includes a collar 12, a first coupler element 14 and a second coupler element 16. A first duct 18 is received within the interior of the collar 12 and within the interior of the first coupler element 14. A second duct 20 is received within the collar 12 and within the interior of the second coupler element 16. The collar 12 has an interior suitable for receiving the ducts 18 and 20 in end-to-end relationship and in generally longitudinal alignment. The first coupler element 14 is translatably secured to the exterior of the collar 12. The first coupler element 14 is translatable so as to suitably compress a seal (to be described hereinafter) between a first position spaced from the exterior of the duct 18 and a second position which would bear against a rib 26 of the duct 18. The second coupler element 16 is also translatably secured to the exterior of the collar 12. The second coupler element 16 is translatable so as to move the seal (to be shown hereinafter) between a first position spaced from the exterior of the duct 12 to a second position bearing against a surface of one of the ribs 32 of the duct 20.

As can be seen in FIG. 1, the first duct 18 has a plurality of ribs 26 formed thereon. Longitudinal channels 28 extend between the ribs 26 and allow liquid and grout therein to communicate between the ribs 26. Longitudinal channels 28 have an outer edge which is flush with the outer diameter of the ribs 26. The first duct 18 has an outer wall 30 which extends between the ribs 26 and defines the interior of the duct 18. The second duct 20 similarly has a plurality of ribs 32, longitudinal channels 34 and wall 36. The first duct 18 is identical in construction to the second duct 20. In normal use, ducts 18 and 20 will receive tendons therein and allow a grout material to fill the interior thereof. The respective channels 28 and 34 allow grout to fill the interior of the respective ducts 18 and 20 and to flow into the ribs 26 and 32, respectively.

In past practice, it has been somewhat difficult to join the respective ends of the ducts 18 and 20 in a properly sealed end-to-end relationship. It is important to provide both the liquid-tight sealing of the ducts 18 and 20 and to prevent the separation of the ducts 18 and 20 from each other. Since time of installation is an important requirement for construction, the coupler apparatus 10 should be sufficiently usable so as to quickly allow the joining of the ends of ducts 18 and 20 together. Since the quality of labor at construction sites can be poor at times, the coupler apparatus 10 should have the ability to be easily installed in a simple and effective manner without complex training or procedures.

The coupler element 14 is translatable about one end of the collar 12. The translating motion in the preferred embodiment of the present invention is established by a threaded relationship between the exterior surface of the collar 12 and the interior surface of the coupler 14. In other embodiments of the present invention, the coupler element 14 can be translatable by slidable or ratcheting motion. Suitable hinging mechanisms or other lever actions can be incorporated with the apparatus 10 so as to facilitate proper translatable motion of the coupler elements 14 and 16 on the collar 12. Coupler element 16 will have a configuration similar to that of coupler element 14 and will translate in the same manner as coupler element 14. Each of the coupler elements 14 and 16 has a plurality of ribs 64 formed on an exterior surface thereof. Each of the plurality of ribs 64 extends longitudinally for a portion of the length of the respective coupler elements 14 and 16. The plurality of ribs are radially spaced from each other around the diameter of the respective coupler elements 14 and 16. Ribs 64 facilitate the ability of a worker to grasp the exterior surface of the coupler elements 14 and 16 and to provide the necessary translatable motion with respect to movement of the coupler elements 14 and 16 onto the respective seals.

Figure 2:
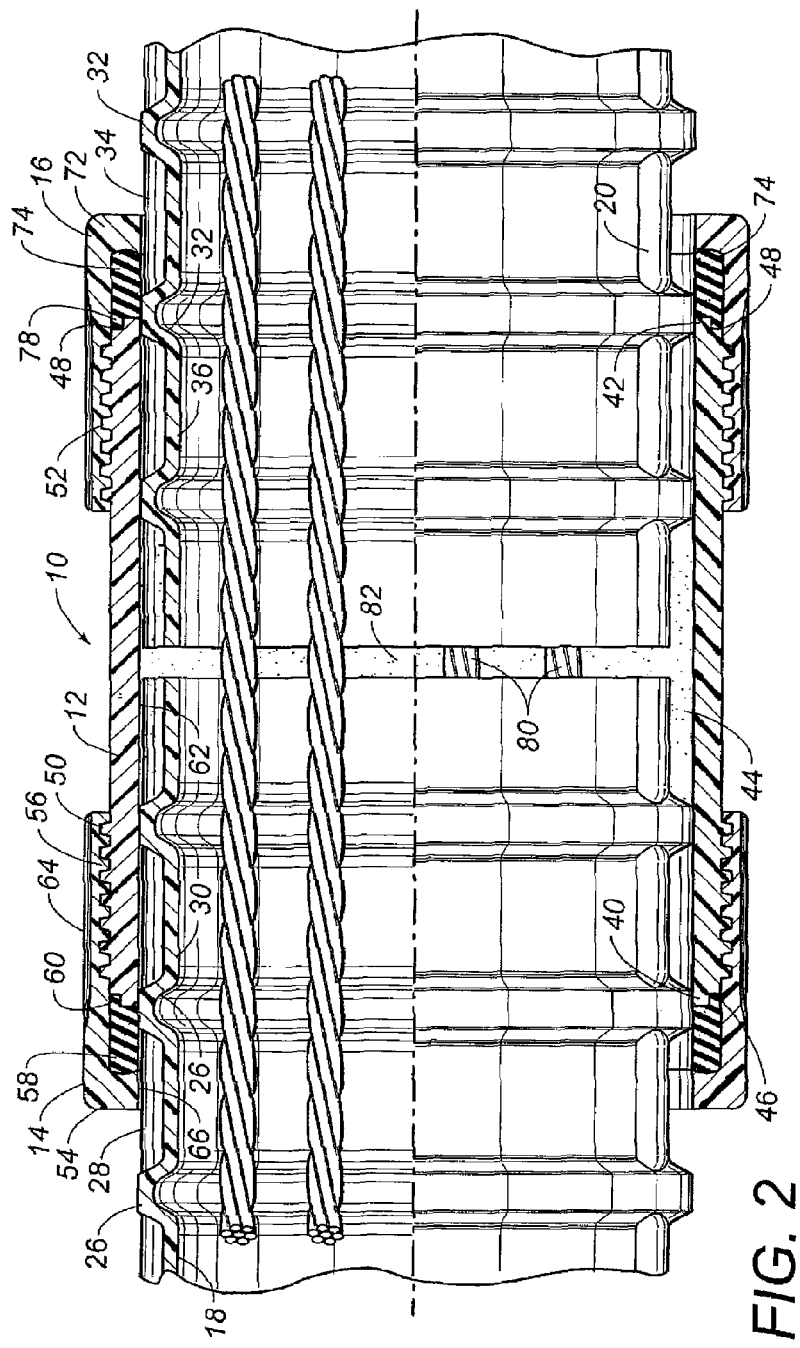
FIG. 2 is a cross-sectional view showing the first and second coupler elements applied to the collar and showing the relationship of the coupler elements to the respective seals when the seals are uncompressed.

FIG. 2 illustrates the collar 12 as having a first end 40 and a second end 42. The collar 12 is a tubular member that defines an interior passageway 44. The interior of the collar 12 should have a suitable diameter so as to receive the ducts 18 and 20 therein. The collar 12 has a constant interior diameter extending between end 40 and end 42. As can be seen in FIG. 2, the end 40 has a notch 46 formed on an exterior surface thereof. Similarly, the end 42 also has a notch 48 formed on an exterior surface thereof. An exterior threaded portion 50 is formed on the exterior of the collar 12 adjacent end 40. Another threaded section 52 is formed on the exterior of collar 12 adjacent end 42.

The first coupler element 14 has a lip 54 formed at one end thereof. As used herein, the term "lip" can pertain to an inwardly extending surface, a projection, a shoulder, or similar structure. The lip 54 extends in spaced relationship from the end 40 of the collar 12. The first coupler element 14 also has an internally threaded section 56 in threadedly translatable relationship with the exterior threaded section 50 of the collar 12. As such, a rotation of first coupler element 14 will cause the coupler element to move relative to the collar 12.

A seal 58 is interposed between the inner surface of the lip 54 and the end 40 of collar 12. The seal 58 can be formed of an elastomeric material. The seal 58 should be suitably compressible so as to move toward the interior 44 of the collar 12 when the lip 54 of first coupler element 14 applies pressure thereon. The seal 58 has an extended portion 60 which is received with the notch 46 at the end 40 of the collar 12. The receipt of the extended portion 60 within the notch 46 facilitates the ability of seal 58 to "flip" downwardly and, ultimately, bear against the rib 26 of the duct 18.

In the position illustrated in FIG. 2, the seal 58 has a surface extending generally flush with the inner wall 62 of the collar 12. Similarly, the inwardmost surface 66 of the lip 54 will also be generally flush with the inner wall 62 of the collar 12. This relationship allows the duct 18 to be easily pushed into the interior 44 of the collar 12 without obstruction or interference by either the seal 58 or the lip 54.

In FIG. 2, it can be seen that the second coupler element 16 has interior threads 70 which are threadedly received by the exterior threads 52 of the collar 12. Similarly, a lip 72 extends downwardly at an outer end of the coupler element 16. A seal 74 is affixed so as to have an extended portion 78 received within the notch 48 at the end 42 of collar 12. The lip 72 will bear against the end of the seal 74 in the same manner that the lip 54 of coupler element 14 bears against the seal 58. The second coupler element 16 will operate in a similar manner as coupler element 14 such that a rotation of the coupler element 16 will cause the seal 74 to be compressed and flip slightly downwardly toward the interior 44 of the collar 12 and to ultimately bear against a surface of the rib 32 of duct 20.

In FIG. 2, it can be seen that a plurality of tendons 80 extends through the interior of the ducts 18 and 20. A grout material fills the interior of the ducts 18 and 20. As a result, when the seals 58 and 74 exert compressive contact against the respective ribs 26 and 32 of the ducts 18 and 20, the grout 82 will be retained within the interior of the collar 12 and the interior of the respective ducts 18 and 20. Additionally, the ducts 18 and 20 will be prevented from being moved longitudinally apart.

Figure 3:
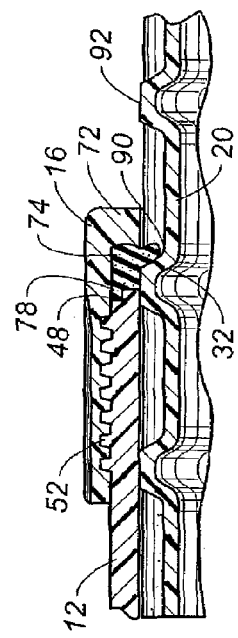
FIG. 3 is a detailed view showing the translatable movement of the coupler element for the compression of the seal.

FIG. 3 shows a detailed view of how the seal 74 is suitably compressible so as to bear against a surface 90 of the rib 32 of duct 20. The same relationship will occur with respect to the seal 58. In FIG. 3, the second coupler element 16 has been suitably rotated about the exterior threaded section 52 on the collar 12. As a result, the lip 72 exerts a compressive force on the seal 74. This compressive force causes the seal 74 to move toward the interior 44 of the collar 12 and to ultimately bear against the surface 90 of rib 32. The receipt of the extended portion 78 within the notch 48 further facilitates the ability of the elastomeric seal 74 to "flip" downwardly and, hence, bear against the rib 32. As a result of this relationship, a strong sealing contact is established with the seal 74. Additionally, the seal 74 will somewhat extrude outwardly and downwardly so as to bear strongly against the flat top surface 92 of rib 32. As a result, the seal 74 establishes two methods of protection. First, longitudinal separation of the ducts 18 and 20 is prevented because of the strong bearing contact between the seal 74 and the surface 90 of rib 32. Additionally, liquid infiltration and exfiltration is prevented because of the strong sealing contact between the surface of the seal 74 and the flat surface 92 at the outer portion of the rib 32.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
   a first duct having a rib formed on an exterior surface thereof, said rib having an outer surface with a side wall extending therefrom;
   a second duct having a rib formed on an exterior surface thereof, said first and second ducts extending in longitudinal alignment, said rib of said second duct having an outer surface with a side wall extending therefrom;
   a collar receiving said first and second ducts therein in generally end-to-end relationship, said collar having a first end and a second end;
   a first coupler element translatably secured to said collar;
   a first seal interposed between a surface of said first coupler element and a surface of said collar, said first coupler element translatable between a first position in which said first seal is spaced from said side wall of said rib of said first duct and a second position in which said first seal is juxtaposed against said surface of said rib of said first duct;
   a second coupler element translatably secured to said collar;
   and a second seal interposed between a surface of said second coupler element and a surface of said collar, said second coupler element translatable between a first position in which said second seal is spaced from said side wall of said rib of said second duct and a second position in which said second seal is juxtaposed against said side wall of said rib of said second duct.

2. The apparatus of claim 1, said first coupler element having a lip extending radially inwardly therefrom, said lip having said surface of said first coupler element thereon, said first seal being interposed between said lip and said first end of said collar.

3. The apparatus of claim 2, said second coupler element having a lip extending radially inwardly therefrom, said surface of said second coupler element being a surface on said lip of said second coupler element, said second seal being interposed between said lip of said second coupler element and said second end of said collar.

4. The apparatus of claim 2, said first coupler element being threadedly translatable on said collar, said first coupler element being rotatable to move said lip thereof between said first and second positions, said second coupler element being threadedly translatable on said collar, said second coupler element being rotatable so as to move said lip thereof between said first and second positions.

5. The apparatus of claim 1, said first seal having an edge affixed to said first end of said collar, said second seal having an edge affixed to said second end of said collar, said surface of said first coupler element bearing against an opposite edge of said first seal, said surface of said second coupler element bearing against an opposite edge of said second seal.

6. The apparatus of claim 1, said collar having an inner wall, said surface of said first and second coupler elements being flush with said inner wall, said first and second seals being flush with said inner wall when in said first position.

7. The apparatus of claim 1, further comprising:

a plurality of tendons extending longitudinally through an interior of said first and second ducts and through an interior of said collar.

8. The apparatus of claim 1, further comprising:

a grout material filling said interior of said first and second ducts, said collar and said first and second coupler elements forming a liquid-tight seal with said first and second ducts respectively so as to prevent grout from flowing outwardly of said first and second ducts and to prevent said first and second ducts from moving longitudinally away from each other when said first and second ends are in said second position.

* * * * *